United States Patent [19]

Anthony

[11] Patent Number: 5,417,340
[45] Date of Patent: May 23, 1995

[54] SPRING-BIASED FLOATING HINGE STRUCTURE

[75] Inventor: John C. Anthony, Fairfield, Conn.

[73] Assignee: Hubbell Incorporated, Orange, Conn.

[21] Appl. No.: 69,834

[22] Filed: Jun. 1, 1993

[51] Int. Cl.$^6$ ............................................. B65D 43/16
[52] U.S. Cl. ................................. 220/342; 220/3.8; 220/242; 220/344; 16/307
[58] Field of Search ................. 220/3.8, 242, 342, 343, 220/344; 16/235, 307

[56] References Cited

U.S. PATENT DOCUMENTS

| | | | |
|---|---|---|---|
| 1,450,857 | 4/1923 | Johnson | 220/343 |
| 1,503,187 | 7/1924 | Fitchett | 220/343 X |
| 1,599,057 | 9/1926 | McFarland | 220/343 X |
| 2,329,716 | 9/1943 | Johnson | 220/343 X |
| 2,557,048 | 6/1951 | Haase | 220/343 |
| 2,867,345 | 1/1959 | Bellek | 220/242 |
| 2,900,212 | 8/1959 | Couch | 220/343 X |
| 3,137,407 | 6/1964 | Mackiewicz | 220/242 |
| 3,399,005 | 8/1968 | MacDonnell | 220/344 X |
| 4,197,959 | 4/1980 | Kramer | 220/242 |
| 4,361,252 | 11/1982 | Black et al. | |
| 4,456,145 | 6/1984 | Frank | 220/242 |

Primary Examiner—Allen N. Shoap
Assistant Examiner—Vanessa Caretto
Attorney, Agent, or Firm—Jerry M. Presson; Leopold Presser

[57] ABSTRACT

A hinge construction for the effectuation or hingedly articulated connection between a lid and an aperture which is located on a plate member. More particularly, there is provided a hinge structure which facilitates a spring-biased floating sealing connection between the lid and a surface about the aperture on the plate member, which may be a component of a mechanically interlocked switch box cover, adapted to impart a uniform sealing pressure to a gasket interposed between structure mounting the lid on the hinge and the surface about the aperture. The hinge arm portion depending from a disc-like member which rotatably mounts the cup-shaped lid, is provided with a hinge pin-receiving through hole of an essentially oblong cross-sectional configuration along its length, and in which the major axis of the oblong hole extends generally perpendicular to the plane of the lower surface of the disc member which has a sealing gasket for contacting the surface about the aperture in the plate member.

10 Claims, 2 Drawing Sheets

SPRING-BIASED FLOATING HINGE STRUCTURE

BACKGROUND OF THE INVENTION

1. Field of the Invention

The present invention relates to a hinge construction for the effectuation or hingedly articulated connection between a lid and an aperture which is located on a plate member, and more particularly, provides for a hinge structure which facilitates a spring-biased floating sealing connection between the lid and a surface about the aperture ion the plate member, which may be a component of a mechanically interlocked switch box cover, adapted to impart a uniform sealing pressure to a gasket interposed between structure mounting the lid on the hinge and the surface about the aperture.

2. Discussion of the Prior Art

In general, hinge constructions of the type considered therein, which are frequently employed in connection with so,called mechanically interlocked switch box covers, incorporate a hinge arrangement possessing a disc-like portion having a cup-shaped closure lid mounted thereon for rotation relative thereto, with the lid having latching elements provided about the free edge of the cup flange portion thereof adapted to engage cooperating latching elements on a raised surface extending about the aperture in the plate member responsive to relative rotation between the closure lid and the aperture, so as to seal the aperture.

The hinge construction, as is well known in the art, essentially includes a depending flange or hinge arm portion projecting downwardly from an edge of the disc portion of the hinge mounting the lid, and extending generally perpendicular thereto; which hinge arm portion at its distal free end is provided with a through hole adapted to receive therein a hinge pin extending through two therewith aligned hinge ears or hinge mounts on the plate member at opposite sides of the flange or hinge arm portion of the hinge structure. A helical spring member may extend about the hinge pin within the aperture so as to impart suitable torsional biasing action to the lid when the latter is latched with the cooperating latching means on the surface structure about the aperture on the plate member, so as to cause a sealing pressure to be imparted to a gasket interposed between the lid-supporting hinge structure and the aperture in the plate member.

Although the foregoing arrangement enables appropriate sealing to be effected between such hinge-mounted lids and plate members, the latter of which may be a constituent of a switch box cover or the like, frequently the utilization of a normally circular or round hole for the hinge pin in the hinge arm does not enable the imposition of a uniform sealing pressure along the perimeter of the annular sealing gasket which is interposed between the lower surface of the lid-supporting hinge disc member and the therewith contacting surface about the aperture in the plate member. This, at times, will either lead to excessive wear or a non-uniform compressive deformation of the sealing gasket, potentially preventing appropriate sealing to be implemented between the component which may enable the ingress of moisture and/or other foreign materials into the switch box.

SUMMARY OF THE INVENTION

In order to ameliorate or eliminate the problems encountered in the technology concerning the provision of a uniform sealing pressure by the hinged connection of such lids onto an aperture in a plate member, such as a switch box cover plate, the present invention contemplates a novel and unique construction for the hinge structure, whereby the distal end of a flange or hinge arm portion depending from a disc-like member which rotatably mounts the cup-shaped lid, is provided with a hinge pin-receiving through hole of an essentially oblong cross-sectional configuration along its length, and in which the major axis of the oblong hole extends generally perpendicular to the plane of the lower surface of the disc member which has a sealing gasket for contacting the surface about the aperture in the plate member.

Furthermore, adjacent one end of the oblong hole in the hinge arm portion of the hinge structure, there is formed a Slot in the end surface of the arm portion and which extends tangentially from the oblong hinge pin-receiving hole, preferably in a plane which is also generally perpendicular to that of the gasket-containing lower surface of the disc member of the hinge structure. A biasing element, such as helical coil spring includes an end tab projecting tangentially outwardly therefrom, such that when the spring is then inserted into the oblong hole, the projecting end tab of the spring engages into the slot extending tangentially from the oblong hinge pin-receiving hole. Consequently, upon pivoting of the hinge structure to close the lid over the aperture, and upon the latching elements on the lid engaging the cooperating latching elements located about the aperture in the plate structure, the helical spring in the oblong hole about the hinge pin will bias the disc member thereof mounting the lid in a specified direction so as to align the components and cause the sealing gasket facing the aperture to impart a generally uniformly distributed pressure against the surface about the aperture; whereas when released from engagement, the lid upon opening of the hinge structure is caused to be displaced in the opposite direction of the oblong hole responsive to the biasing action of the helical spring.

This, in effect, produces a so-called "floating" or self-aligning effect between the hinge structure and the lid mounted thereon with regard to the surface about the aperture on the plate member so as to always ensure an appropriate uniform compression being encountered along the circumference of the sealing gasket upon contacting the surface about the aperture. This will ensure an appropriate and uniform sealing action being present at all times in the closed and latched condition of the lid on the switch box cover without in any appreciable manner necessitating extensive modifications to existing similar types of hinge structures, thereby rendering the entire invention simple and economical in nature. Moreover, the exertion of a uniform pressure against the sealing gasket when pressed against the surface about the aperture also enhances the service life of such gaskets by avoiding the formation of so-called "flat spots" caused by uneven pressure acting on the gasket at various locations along the perimetral or circumferential extent thereof.

Accordingly, it is an object of the present invention to provide a hinge structure which will provide for an improved sealing action between a lid and a surface about an aperture adapted to be sealingly closed by the lid.

Another object of the present invention is to provide for a unique floating hinge structure which will enable a sealing gasket mounted therein intended to contact the surface about the aperture to be imparted a uniform pressure upon the latching of the lid in the closed position over the aperture.

Yet another object of the present invention is to provide a novel and improved hinge structure for the lid closure of a switch box cover which includes an oblong hole for a hinge pin acted upon by the biasing force of a spring so as to provide for an enhanced and uniform sealing action on a sealing gasket increasing the dependability and quality of the seal.

BRIEF DESCRIPTION OF THE DRAWINGS

The foregoing and other objects and advantages of the present invention may now be more clearly ascertained from the following detailed description of an exemplary embodiment of the floating hinge structure, taken in conjunction with the accompanying drawings; in which.

Figure 1:
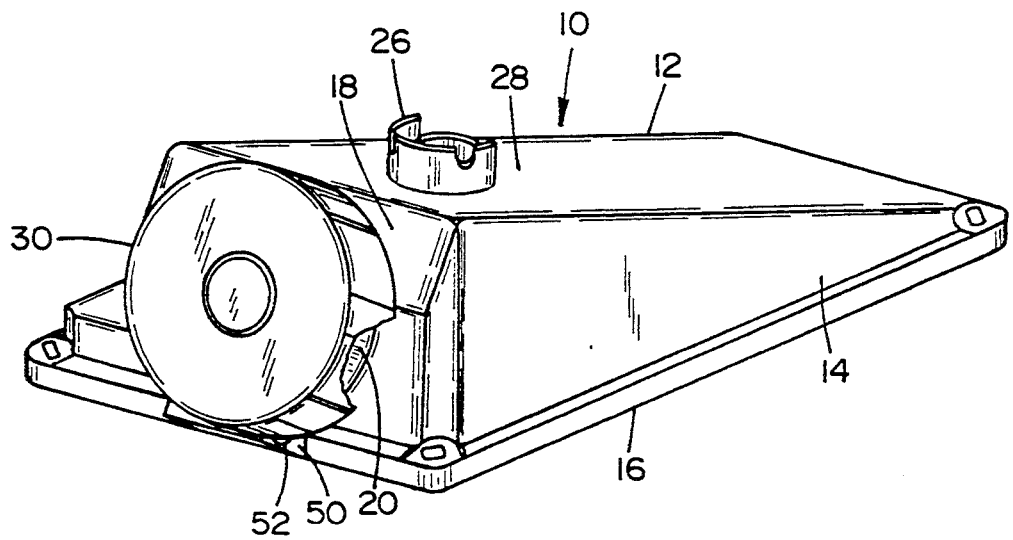
FIG. 1 illustrates a perspective view of a cover section of a switch box incorporating a lid and hinge structure for the closure of an aperture pursuant to the invention.
Figure 2:
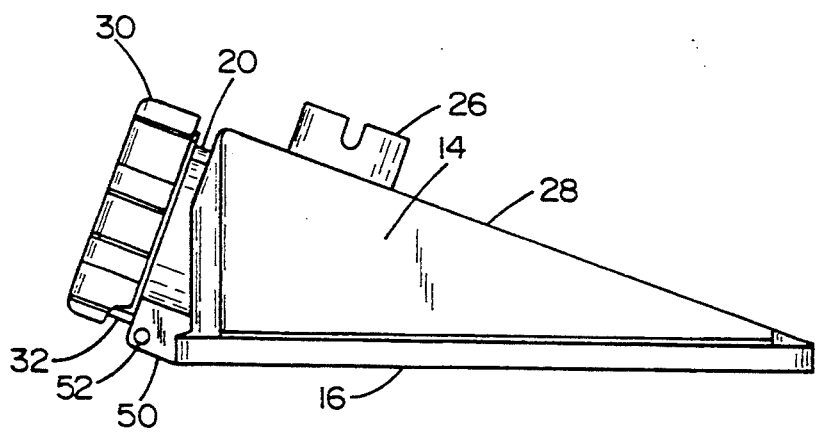
FIG. 2 illustrates a side view of the cover section of FIG. 1.
Figure 3:
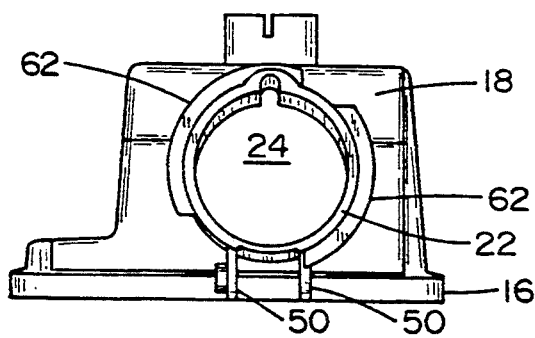
FIG. 3 illustrates a front view of the cover section with the lid having been removed therefrom.

DETAILED DESCRIPTION,

Referring now in more specific detail to the drawings, and particularly to FIGS. 1 to 3, there are illustrated the cover plate components 10 of a switch box, or similar structure, wherein the components are primarily constituted from a molded plastic material; for example, such as PBT or the like, which is substantially rigid in nature.

In effect, the plate structure 10 of the switch box cover includes a raised sloped wall portion 12 having sidewalls 14, a peripheral flange-like bottom edge wall 16 and an upstanding wall 18 at the higher end thereof. Formed in the wall 18 is a protruding integrally molded nipple 20 with a flange 22 extending about its free leading end, and having an aperture 24 formed therein communicating with the interior of the cover plate component. The aperture 24 facilitates access from the outside with operating structure, such as switching mechanisms (not shown) located within the switch box and operated from a switch lever connection 26 located on the upper wall surface 28 of the raised wall portion 12.

An openable lid member 30 for sealingly closing the aperture 24 is mounted on a hinge structure 32 as shown specifically in FIGS. 4 through 9 of the drawings.

As shown in the drawings, the hinge structure 32, which is also molded from a plastic material, includes a disc member 34 having a central hub-like portion 36 on one surface 38 thereof.

Extending from one edge of the disc member 34 perpendicular to the plane thereof and in the direction of its opposite surface 40, is a flange-like or hinge arm portion 42 in the general shape of a rectangular plate, which is integrally molded with the disc member 34, so as to form a hinge pivot. The free end of the hinge arm portion 42 which is distal from the disc member has an enlarged cross-sectional or thickened end portion 44 which is provided with a lateral through hole 46 adapted to receive a hinge pin therein, as described hereinbelow.

Integrally molded with or fastened to the lower edge portion of the front wall surface 16, 18 of the switch box cover plate 10 are a pair of spaced hinge supporting projections or ears 50 having aligned through holes 52 formed therein, and adapted to have a hinge pin passed therethrough when the hole 46 in the hinge pivot arm portion 42 is aligned therewith upon being positioned between the ears 50. This will connect the hinge structure 32 to the cover plate 10 of the switch box, while enabling pivoting motion of the former about the longitudinal axis of the hinge pin.

Figure 4:
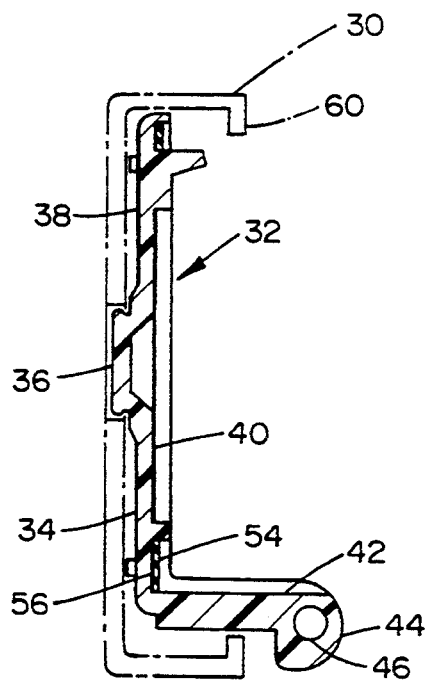
FIG. 4 illustrates a view, shown on a somewhat enlarged scale, taken through the hinge structure of FIG. 1, with the lid shown in phantom for purposes of clarity, and with the hinge structure being of the prior art type currently utilized in the technology.
Figure 5:
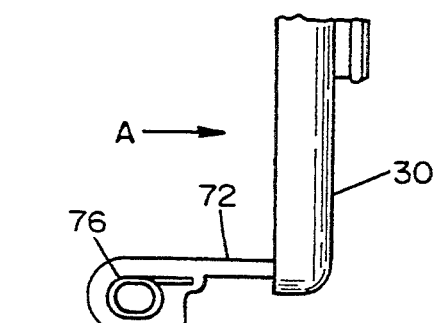
FIG. 5 illustrates a sectional view similar to that of FIG. 4, on an enlarged scale showing the modification thereof conforming the hinge flange or arm portion to the inventive concept.
Figure 7:
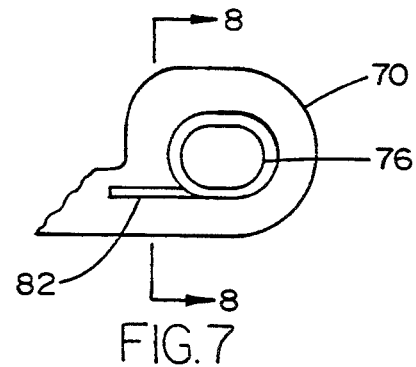
FIG. 7 illustrates, on an enlarged scale, a fragmentary detail of the hinge pin-receiving end of the hinge arm portion of the hinge structure illustrating the novel configuration thereof.
Figure 6:
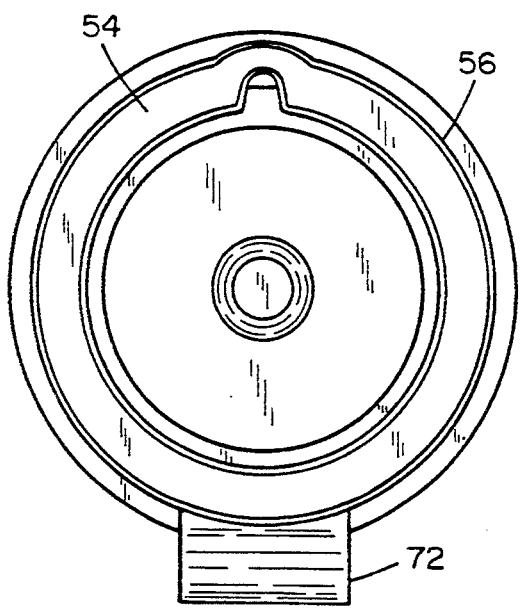
FIG. 6 illustrates a frontal view of the disc member of the hinge portion taken in the direction of arrow A in FIG. 5.
Figure 8:
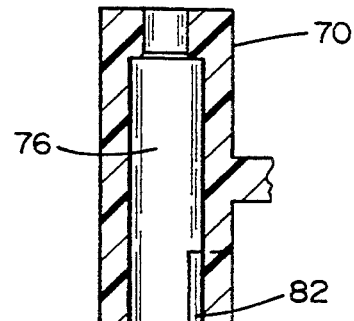
FIG. 8 illustrates a sectional view taken along line 8—8 in FIG. 7.

Mounted on the disc member 34, as shown in the views of FIGS. 4 through 6, is an annular gasket 54 arranged in an annular recess 56 formed in the surface 40 of the disc member facing towards the aperture 24. The gasket 54 is adapted to sealingly contact the surface of the flange 22 about the aperture 24 upon interengagement between latching members 60 formed on the lid member 30 and complementary latching members 62 on the flange 22 about the aperture 24 responsive to suitable rotation of the lid member 30 about the central portion 36 on the disc member 34 of the hinge structure 32.

The foregoing is essentially directed to hinge structure which is basically known in this technology; in essence, the use of such pivotally connected hinge structure having a lid rotatably mounted thereon for latching engagement with a nipple having an aperture therein so as to form a sealing contact between a gasket and an upper surface of the nipple.

However, difficulties have been encountered in effectuating a uniform sealing between the gasket and the contacting surface ion the flange about the aperture in that, at times, upon the latching of the lid member in its closed position over the aperture, the close fit of the hinge pin within the hole or bore in the hinge arm and the hinge ears fastening the hinge structure to the cover plate does not permit lateral adjustment of the disc member relative to the flange about the aperture which would enable uniform sealing pressure to be exerted by the gasket against the therewith contacting surface of the flange.

Consequently, pursuant to the invention, in order to overcome this drawback, there is provided a novel hinge structure, particularly a novel free or distal end 70 for a hinge arm portion 72, forming a so-called "floating" hinge pivot, as more specifically shown in FIGS. 5 through 9 of the drawings, in which elements similar to or identical with those shown in FIGS. 1 through 4 are identified by the same reference numerals. In that instance, a through hole 76 for receiving a hinge pin and extending through the hinge arm end 70 has a shape which is essentially oblong in cross-section, whereby the major axis of the oblong cross-section of the hinge hole 76 extends generally perpendicular to the disc member 34 of the hinge structure 32, and especially perpendicular or normal to the surface 40 of the disc member 34 containing the annular gasket 54 in recess 56.

Figure 9:
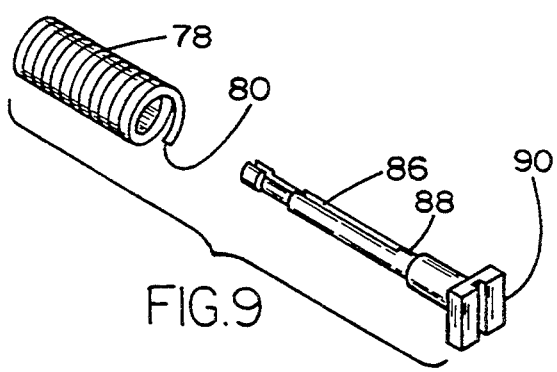
FIG. 9 illustrates an exploded perspective view of the hinge pin and helical spring member for the hinge structure prior to assembly therein.

Positioned in the oblong hole 76 is a longitudinally extending helical coil spring 78 which can be laterally displaced within the oblong hole along the major axis thereof, so as to enable lateral shifting motion of the hinge pivot for the hinge arm portion 72 along the major axis of the oblong hinge hole. One end 80 of the helical spring 78 includes a tangentially projecting end portion which is insertable into a slot in arm end 70 extending tangentially from one edge of the oblong hole 76 along the direction of the major axis the latter, so as to prevent the spring from rotating within the oblong hole, whereas the opposite end of the helical spring 78 includes a radially inwardly extending end (not shown) adapted to engage a longitudinally extending recess or slot 86 formed in hinge pin 88, as shown in FIG. 9, preventing the pin 88 from rotating within the hinge hole relative to the spring.

The oblong hole 76 in the hinge arm end 70, and the slot 82 which is formed in an end surface of the hinge arm, which is also oriented substantially perpendicular to the plane of the disc member 34 of the hinge structure 32 ensures that the lateral moveability of the hinge structure at its hinge pivot during the pivotal opening or, closing movement of the lid 30 will provide a lateral adjustment during any latching of the lid member 30 onto the flange 22 so as to cause the torsional biasing action of the helical spring 78 to enable the generating of a uniform pressure acting on the gasket 54, and to resultingly produce a uniform sealing action between the gasket and the flange 22 extending about aperture 24.

Conversely, when the lid member 30 is unlatched from flange 22 and swung open, the helical spring 78 will cause the hinge pin 88 to be displaced towards the opposite end of the oblong hole, thereby imparting a "floating" action to the lid member 30.

As may be ascertained from the drawing, the hinge pin 88 is an elongate member of circular cross-section, passing through the helical coil spring 78 which is adapted to be positioned in the oblong hole, and with one end of the hinge pin having a squared-off shank 90 to fit into a squared-off hole provided in one of the hinge mount members 50 on the cover plate so as to prevent displacement and rotation of the hinge pin.

From the foregoing, it clearly appears that the invention is adapted to enable, in a simple and inexpensive expedient manner to provide for an adjustment for the lid on a mechanically interlocked switch box cover so as to ensure a uniform sealing pressure being exerted on a gasket and to provide an improved sealing action, while concurrently extending the service life of the gasket and the entire structure.

While there has been shown and described what is considered to be a preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A hinge structure for the hinged connection between a lid and an aperture on a plate member which is sealingly engageable by said lid upon positioning of said lid on said aperture, comprising:
   a) a disc member of said hinge structure rotatably mounting said lid, said lid having latching means for selectively engaging and releasing cooperating latching means located about the aperture on said plate member responsive to specified rotational movements imparted to said lid when closingly superimposed on said aperture;
   b) hinge arm means depending from an edge of said disc member for forming a hinged connection with said plate member, said hinge arm means including, an opening for a hinge pin extending through said hinge arm means at an end distant from said disc member, said opening having an oblong cross-section with the major axis of said oblong cross-section being oriented perpendicular to a surface on the disc member facing said aperture;
   c) spaced hinge mounting means on said plate member for receiving the opening-containing end of said hinge arm means therebetween, said hinge mounting means each including a hole axially alignable with the axis of said oblong opening; a hinge pin extending through said oblong opening and said holes for hingedly interconnecting said, hinge arm means and said hinge mounting means;
   d) and resilient biasing means in said oblong opening being operatively connected with said hinge pin and said hinge arm means so as to torsionally and laterally bias said lid into uniform sealing contact with said aperture during latching engagement of the latching means on said lid with the cooperating latching means proximate said aperture.

2. A hinge structure as claimed in claim 1, wherein said resilient biasing means comprises a helical coil spring having a tangentially extending projection at one end thereof; and said hinge arm means having slot means formed therein for engagingly receiving said projection to enable said helical coil spring to exert said torsional biasing force on said lid during pivotal movement of said lid relative to said aperture.

3. A hinge structure as claimed in claim 2, wherein said slot means extends tangentially from said oblong hole along the direction of the major axis of said oblong hole.

4. A hinge structure as claimed in claim 1, wherein a gasket is mounted on a surface of said disc member facing said aperture, whereby said lid upon engagement between the latching means and cooperating latching means exerts a uniformly distributed pressure over a surface of said gasket facing said aperture to effectuate sealing of said aperture.

5. A hinge structure as claimed in claim 1, wherein said aperture is formed in a protruding nipple on said plate member having a flange with the cooperating latching means arranged thereon.

6. A hinge structure as claimed in claim 1, wherein said lid comprises a cup-shaped member, said latching means being formed on a free edge of said cup-shape.

7. A hinge structure as claimed in claim 1, wherein said disc member and said hinge arm means are integrally formed.

8. A hinge structure as claimed in claim 7, wherein said disc member, said hinge arm means and said lid consist of a molded plastic material.

9. A hinge structure as claimed in claim 1, wherein said plate member comprises a constituent of a switch box cover.

10. A hinge structure as claimed in claim 9, wherein said plate member consists of a plastic material.

* * * * *